United States Patent
Council, III

(10) Patent No.: US 9,827,604 B2
(45) Date of Patent: Nov. 28, 2017

(54) GROUNDWATER REMEDIATION SYSTEM AND METHOD

(71) Applicant: Edward Augustus Council, III, Xenia, OH (US)

(72) Inventor: Edward Augustus Council, III, Xenia, OH (US)

(*) Notice: Subject to any disclaimer, the term of this patent is extended or adjusted under 35 U.S.C. 154(b) by 269 days.

(21) Appl. No.: 14/806,812

(22) Filed: Jul. 23, 2015

(65) Prior Publication Data

US 2017/0021400 A1  Jan. 26, 2017

(51) Int. Cl.
| | |
|---|---|
| *C02F 1/00* | (2006.01) |
| *E02B 15/00* | (2006.01) |
| *E21B 43/00* | (2006.01) |
| *B01D 59/26* | (2006.01) |
| *B09C 1/00* | (2006.01) |
| *C02F 1/20* | (2006.01) |
| *C02F 3/34* | (2006.01) |
| *B09C 1/10* | (2006.01) |
| *C02F 103/06* | (2006.01) |

(52) U.S. Cl.
CPC .............. *B09C 1/002* (2013.01); *B09C 1/005* (2013.01); *B09C 1/10* (2013.01); *C02F 1/20* (2013.01); *C02F 3/34* (2013.01); *C02F 2103/06* (2013.01); *C02F 2201/002* (2013.01)

(58) Field of Classification Search
CPC .. C02F 2103/06; C02F 1/20; C02F 2101/322; C02F 3/101; G02B 5/22; Y02W 10/15; E21B 43/04; E21B 43/121

USPC ........... 210/170.7, 172.2; 405/136; 166/267; 95/230

See application file for complete search history.

(56) References Cited

U.S. PATENT DOCUMENTS

| | | | |
|---|---|---|---|
| 4,765,902 A | 8/1988 | Ely et al. | |
| 5,017,289 A | 5/1991 | Ely et al. | |
| 5,123,492 A * | 6/1992 | Lizanec, Jr. ............ | E21B 17/00 166/242.1 |
| 5,277,518 A * | 1/1994 | Billings .................... | B09C 1/00 166/246 |
| 5,402,848 A * | 4/1995 | Kelly ...................... | B09C 1/005 166/266 |
| 5,456,550 A | 10/1995 | Devlin | |
| 5,464,309 A * | 11/1995 | Mancini .................. | B09C 1/005 166/236 |
| 5,611,402 A | 3/1997 | Welsh | |
| 5,626,437 A * | 5/1997 | Hunt ....................... | B09C 1/002 210/610 |

(Continued)

*Primary Examiner* — Ana Fortuna
(74) *Attorney, Agent, or Firm* — Ancel W. Lewis, Jr.; Cochran Freund & Young LLC

(57) ABSTRACT

A system for intercepting, treating and venting vapors from contaminated groundwater includes a borehole that extends into the groundwater and has an open top end, a porous liner against the outer wall of the borehole and porous fill material inside the liner. The fill material can include materials to retard and degrade contaminants in the vapors. The system can include a slotted aeration tube in the borehole, vegetation planted in the open end of the borehole, impermeable sections in the liner, and impermeable ground cover around the top end of the borehole. A method for intercepting, treating and venting of vapors from contaminated groundwater includes the system and pulling vapors out the top end of the borehole with variations in atmospheric barometric pressure.

9 Claims, 1 Drawing Sheet

(56) References Cited

U.S. PATENT DOCUMENTS

| | | | | |
|---|---|---|---|---|
| 5,874,001 A | * | 2/1999 | Carter | B09C 1/10 |
| | | | | 210/610 |
| 6,250,237 B1 | * | 6/2001 | Licht | B09C 1/002 |
| | | | | 111/200 |
| 6,428,694 B1 | | 8/2002 | Brown | |
| 6,979,150 B1 | | 12/2005 | Varvel | |
| 9,289,806 B2 | * | 3/2016 | Council, III | B09C 1/005 |
| 2017/0021400 A1 | * | 1/2017 | Council, III | B09C 1/002 |

* cited by examiner

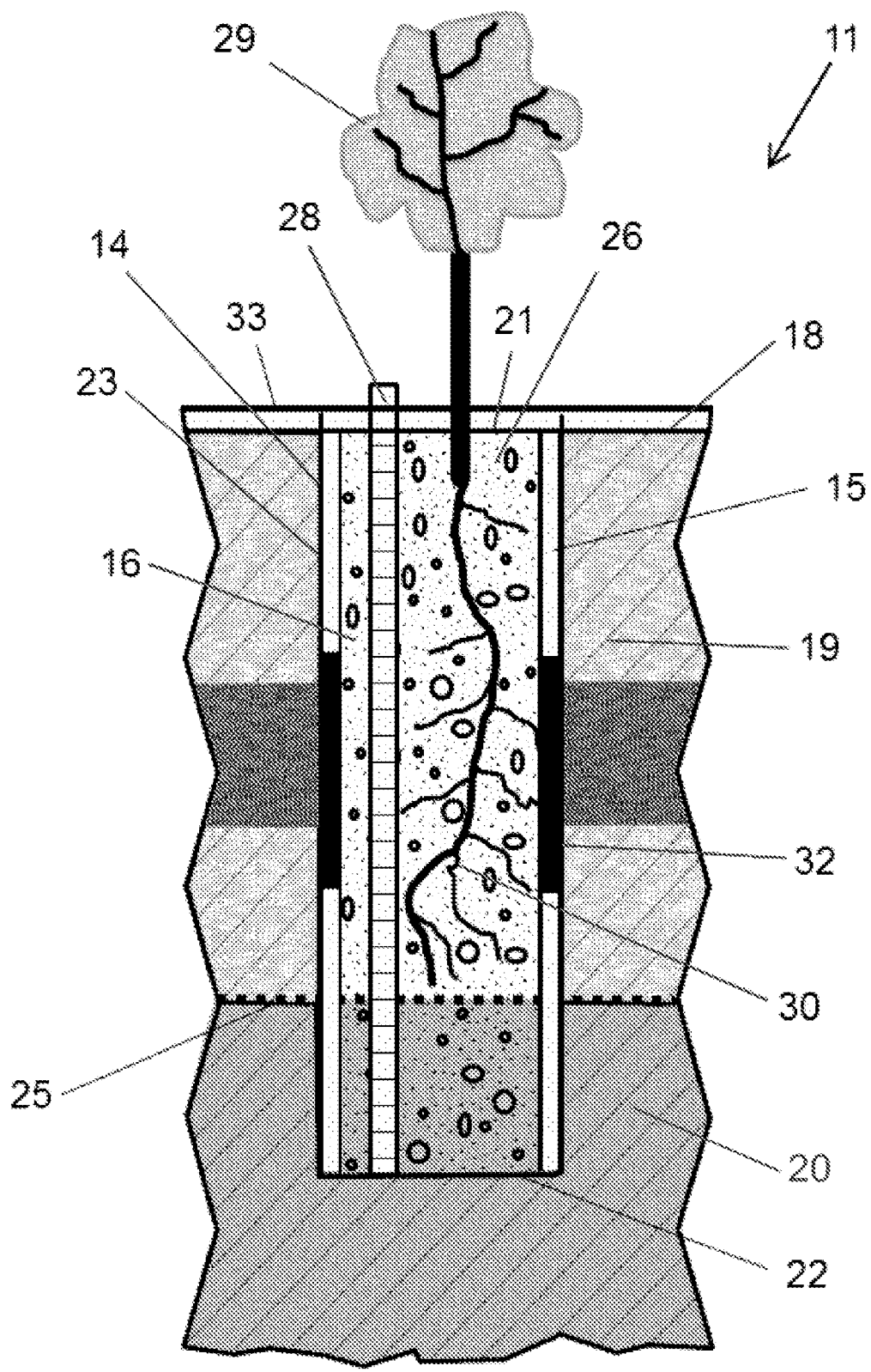

GROUNDWATER REMEDIATION SYSTEM AND METHOD

TECHNICAL FIELD

The present invention relates to groundwater remediation, and more particularly to a passive system and method for intercepting, treating and venting volatile and semi-volatile contaminants from groundwater.

BACKGROUND ART

Groundwater contamination related to volatile or semi-volatile compounds is common and can cause serious harm to people, other animals and plants. The United States spends billions of dollars each year treating groundwater contamination. Sources of groundwater contamination include leaking pipelines, chemical spills, landfills and transportation mishaps. Chemicals released at or near the ground surface can migrate through the vadose zone and into the groundwater.

The vadose zone, between the ground surface and the water table, generally consists of subsurface sediments that were deposited in substantially horizontal layers. Porosity levels vary from layer to layer with the conductance of fluids and soil gases usually much greater in the horizontal than in the vertical direction. These conductivity conditions also exist in the saturated materials located below the water table in a zone commonly known as a groundwater aquifer.

Vapors, including gaseous contaminants with moderate to high Henry's Law Constants that are dissolved in the groundwater and volatile liquid contaminants in the groundwater, can escape or evaporate, respectively, back into the vadose zone and become part of the vadose zone soil gas. Conditions that influence the movement and evaporation of contaminants from the groundwater to the vadose zone include a vadose zone with permeable layers, and periodic changes in atmospheric pressure that affect the entire vadose zone.

Prior known remediation systems and methods to treat contaminated groundwater include two main types: in-situ treatments that primarily treat contamination below ground surface, and treatment processes that occur mostly above ground surface. All of these prior known groundwater remediation systems and methods require expensive groundwater treatment wells and above ground infrastructure to support or control the groundwater remediation activities. These prior known remediation systems all include cased wells that are drilled through the vadose zone and into the contaminated aquifer. The cased wells have casings that have smaller diameters than the boreholes and often extend several feet above ground.

The cased well casings in the prior known groundwater remediation systems and methods have a screen section that extends upwardly a selected distance from the bottom end of the borehole. These cased wells generally have engineered porous fill material located between the screen and the borehole wall from the bottom end up to slightly above the top of the screen section. Above the fill material substantially impermeable materials seal the space between the casing and the borehole wall. Fluids can only travel up or down the inside of the casing from the screened section to treatment systems located above the ground surface and usually at some distance from the treatment wells.

The prior known remediation systems include various blowers, pumps and other components that are often expensive. Power to run the mechanical and electrical components, as well as the ongoing equipment maintenance activities adds to the cost. In addition, regulatory requirements in many states require that treatment wells and other components be removed after the systems are no longer in use, adding to the costs associated with operating these prior known remediation systems.

The time needed to complete the groundwater remediation often takes years to decades of time with prior known remediation methods and systems. The wells in prior known remediation systems are also limited in location as the above ground components are restricted to areas where near ground obstructions are not a hazard to transportation systems or pedestrians. During the remediation period impacted properties rarely can be used for any other purpose but the operation of the treatment systems, and many of these properties must have security fencing to protect and prevent unwanted access to the remedial equipment or the treatment wells.

Contaminants from the groundwater will migrate through the vadose zone if a pathway conducive to this movement exists. Such a pathway must include a porous transport route from the groundwater, through the horizontal layers in the vadose zone and into the atmosphere. In addition, differences must exist between the pressures of the contaminants and that of the atmosphere in order to support the transport of contaminants upwards and through the conductive pathway. If a porous pathway does not exist, the contaminants will remain confined below ground in semi-equilibrium with the contaminants present in the groundwater. Movement of these materials is primarily by slow diffusion processes toward the ground surface. The cased wells of prior known groundwater remediation systems are constructed with only the screen section at the bottom of the casing, substantially limiting migration of vapors through the vadose zone to the surface.

DISCLOSURE OF THE INVENTION

A system for intercepting, treating and venting vapors from contaminated groundwater includes a least one borehole, a gas permeable liner, and porous fill material. The borehole defines a borehole cavity, and has a bottom end in the ground water below the water table, a spaced, open top end at the ground level and an inwardly facing outer wall of soil extending from the bottom end to the top end. The liner is in the borehole against the outer wall and around the borehole cavity. The liner prevents migration of fine grain particles from the soil into the borehole cavity. The fill material fills the borehole cavity and has a porosity significantly greater than the soil. The fill material can include materials to retard and degrade contaminants in the vapors such as organic carbon, reactive iron and nutrients for microbial activity. The system can also include a hollow, slotted aeration tube with a diameter smaller than the borehole that extends through the fill material from the top end towards the bottom end of the borehole. Vegetation can be planted in the fill material at the top end of the borehole to reduce compaction and maintain porosity of the fill material. Variations in atmospheric barometric pressure pull vapor from the groundwater and soil into the borehole cavity, and out the open top end of the borehole. The system can also include a ground cover of low permeability material around the top end of the borehole. A method for intercepting, treating and venting of vapors from contaminated groundwater includes the steps of providing the system described above and pulling vapors from the groundwater and soil to the borehole cavity and out the top end of the borehole with variations in atmospheric barometric pressure.

BRIEF DESCRIPTION OF THE DRAWINGS

Details of this invention are described in connection with the accompanying drawing that bears similar reference numerals in which:

The FIGURE is a schematic side elevation view of a system embodying features of the present invention.

DETAILED DESCRIPTION OF THE INVENTION

Referring to the FIGURE, a system 11 for intercepting, treating and venting vapors from contaminated groundwater, embodying features of the present invention, includes one or more spaced boreholes 14 each having a liner 15 and fill material 16. Each borehole 14 is drilled from ground level 18 downwardly to a selected depth through the soil 19 and into the groundwater 20. The borehole 14 has an open top end 21 at ground level 18, a spaced bottom end 22, and an inwardly facing outer wall 23 of the soil 19 that extends from the top end 21 to the bottom end 22. Preferably the bottom end 22 is located several feet below the water table 25. The borehole 14 defines a borehole cavity 26.

The liner 15 fits into the borehole 14 adjacent to the outer wall 23, and extends from the top end 21 to the bottom end 22. The liner 15 is gas permeable and can be made from organic or inorganic mesh. The liner 15 reduces and prevents fine grain particles in the soil 19 migrating into the borehole cavity 26. The liner 15 can include one or more gas impermeable sections 32 at selected depths to prevent seepage of water and other substances from specific layers in the soil 19.

The borehole cavity 26, inside the liner 15, is filled to the top end 21 of the borehole 14 with the fill material 16. The fill material 16 is porous to allow the free flow of vapors into and up the borehole cavity 26. The fill material 16 is preferably sand or gravel consisting of particles within a well-defined size range. The uniform size of the particles in the fill material 16 prevents compaction and maintains porosity in the borehole cavity 26. Preferably, the fill material has a porosity an order of magnitude greater than the porosity of the surrounding soil 19.

The fill material 16 prevents collapse of the borehole 14 and keeps the borehole 14 open to gas movement. The fill material 16 allows the vapors and air to exist at barometric pressure levels throughout the entire length of the borehole 14. The fill material 16 allows the unimpeded migration of vapors at higher pressure up the borehole 14 to the ground level 18 when favorable barometric conditions exist.

Materials capable of retarding and/or degrading contaminants in the vapors can be added to the fill material 16 to selectively remediate the contaminants as the vapors moves up the borehole 14 to ground level 18. The materials for retarding and/or degrading contaminants in the vapors can include one or all of organic carbon, reactive iron and nutrients for microbial activity.

The system 11 can include a slotted aeration tube 28 having a diameter smaller than the diameter of the borehole 14. The tube 28 extends downwardly through the fill material 16 from the top end 21 to the bottom end 22 of the borehole 14. The tube 28 aids the transfer of vapors into the atmosphere from the entire length of the borehole 14.

The system 11 can include vegetation 29 planted in the fill material 16 at the top end 21 of the borehole 14. The roots 30 of the vegetation 29 extend downwardly into the fill material 16. The roots 30 reduce settling and compaction of the fill material 16, and thereby maintain the permeability and porosity of the fill material 16.

The liner 15 can include one or more gas impermeable sections 32 at selected depths above the water table 25. The gas impermeable sections 32 prevent water and other liquids from migrating into the borehole 14 from saturated layers or intervals in the otherwise unsaturated vadose zone. The system 11 can include ground cover 33 around the top end 21 of the borehole 14 on top of the soil 19 at ground level 18. The ground cover 33 is made from a material of low permeability, such as bentonite clay, concrete or a geosynthetic liner. The ground cover 33 traps vapors in the shallow subsurface soil 19, and allows the pressure of the vapors to increase above barometric pressure levels.

A method for intercepting, treating and venting vapors from contaminated groundwater, embodying features of the present invention, includes the steps of providing the system 11, as described above, and pulling the vapors from the soil 19 to the borehole cavity 26 and out the top end 21 of the borehole 14 with variations in atmospheric barometric pressure. More specifically the method includes the steps of providing at least one borehole 14 that extends into the groundwater 20 below the water table 25, installing a gas permeable liner 15 in the borehole 14, filling a borehole cavity 26 inside the liner 15 with porous fill material 16, and pulling the vapors from the soil 19 to the borehole cavity 26 and out the top end 21 of the borehole 14 with variations in atmospheric barometric pressure. The borehole 14 has a top end 21 at the ground level 18, a spaced bottom end 22 below the water table 25 and an inwardly facing outer wall 23 of soil 19 extending downwardly from the top end 21 to the bottom end 22. The borehole 14 defines a borehole cavity 26. The top end 21 is open to atmosphere above the ground level 18 to allow unimpeded flow of gases. The liner 15 is installed in the borehole 14 against the outer wall 23, around the borehole cavity 26 from the top end 21 to the bottom end 22 to reduce and prevent fine grain particles in the soil 19 migrating into the borehole cavity 26.

The method can also include the steps of providing a hollow, slotted aeration tube 28 having a diameter smaller than the borehole 14 with the tube 28 extending through the fill material 16 from the top end 21 towards the bottom end 22 of the borehole 14, planting vegetation 29 in the fill material 16 at the top end 21 of the borehole 14 with roots 30 extending downwardly to reduce compaction and maintain porosity of the fill material 16, and providing a ground cover 33 of low permeability material around the top end 21 of the borehole 14, at ground level 18, over the soil 19.

The fill material 16 can include materials capable of retarding and/or degrading contaminants in the vapors to selectively remediate the contaminants such as organic carbon, reactive iron and/or nutrients for microbial activity. The fill material 16 can have a porosity at least an order of magnitude greater than the soil 19. The liner 15 can have at least one gas impermeable section 32 at a selected depth.

The system 11 creates conditions whereby changes that periodically occur to the atmospheric pressure and differences between the atmospheric pressure and pressures present at the water table cause the off-gassing of volatile and semi-volatile contaminants from the groundwater 20. The system 11 provides a preferential porous pathway that allows the collection of the contaminated vapors present both adjacent to the water table 25 and contaminated vapors that have migrated from the groundwater 20 but remain within the vadose zone and within the radius of influence of the borehole 14. The system 11 provides a route for the unimpeded migration of contaminated vapors within the borehole 14 and into the atmosphere. Changes in pressure between the vapors and the atmosphere provide the mechanism for the movement of the vapors into the borehole 14 and upward towards the atmosphere.

The cost to construct the system 11 is significantly less than the cost to construct the wells in prior known groundwater remediation systems. The system 11 eliminates operating costs associated with the prior known groundwater remediation systems. The system 11 eliminates the maintenance costs associated with the prior known groundwater remediation systems. The system 11 does not need to be removed when use of the system 11 stops, eliminating the removal costs associated with the wells in prior known groundwater remediation systems.

The wells in prior known groundwater remediation systems are constructed with a single screen section adjacent to the bottom of the casing, and do not treat or vent vapors that have migrated from the groundwater 20 into the vadose zone. The system 11 vents vapors from layers along the whole extent of the borehole 14, as compared to the wells in prior known groundwater remediation systems that only vent vapors from a small interval near the bottom. The system 11 can be built flush with the ground level 18 and therefore can be located almost anywhere, including areas prone to vehicle and pedestrian traffic. The prior known groundwater remediation systems project above the ground, would be damaged by vehicle traffic, and would present a tripping hazard for pedestrian traffic.

Although the present invention has been described with a certain degree of particularity, it is understood that the present disclosure has been made by way of example and that changes in details of structure may be made without departing from the spirit thereof.

What is claimed is:

1. A method for intercepting, treating and venting vapors from contaminated groundwater below a water table, comprising the steps of:

providing a least one borehole with a top end at said ground level, a spaced bottom end spaced below said water table and an inwardly facing outer wall of soil extending downwardly from said top end to said bottom end, said borehole defining a borehole cavity, said top end being open to atmosphere above said ground level to allow unimpeded flow of gases, installing a gas permeable liner in said borehole against said outer wall and around said borehole cavity from said top end to said bottom end to reduce and prevent fine grain particles in said soil migrating into said borehole cavity, and filling said borehole cavity inside said liner with porous fill material, and, pulling said vapors from said groundwater and said soil to said borehole cavity and out said top end of said borehole with variations in atmospheric barometric pressure.

2. The method as set forth in claim 1 including the step of providing a hollow, slotted aeration tube having a diameter smaller than said borehole, said tube extending through said fill material from said top end towards said bottom end of said borehole.

3. The method as set forth in claim 2 wherein said tube extends to said bottom end.

4. The method as set forth in claim 1 wherein said fill material has a porosity at least an order of magnitude greater than said soil.

5. The method as set forth in claim 1 including the step of retarding and degrading contaminants in said vapors with materials in said fill material.

6. The method as set forth in claim 1 wherein said fill material includes at least one of organic carbon, reactive iron and nutrients for microbial activity.

7. The method as set forth in claim 1 including the step of planting vegetation in said fill material at said top end of said borehole with roots extending downwardly to reduce compaction and maintain porosity of said fill material.

8. The method as set forth in claim 1 wherein said liner has at least one gas impermeable section at a selected depth.

9. The method as set forth in claim 1 including the step of providing a ground cover of low permeability material around said top end of said borehole, at said ground level, over said soil.

* * * * *